United States Patent Office 3,076,847
Patented Feb. 5, 1963

3,076,847
ALIPHATIC ALDEHYDES
Vladimir Prelog, Zurich, Switzerland, assignor to Ciba Corporation, a corporation of Delaware
No Drawing. Filed Jan. 14, 1959, Ser. No. 786,695
Claims priority, application Switzerland Jan. 17, 1958
2 Claims. (Cl. 260—593)

This invention relates to $\alpha:\beta$-substituted $\beta$-acyl-aliphatic aldehydes, and especially compounds of the formula

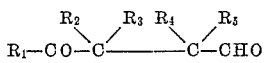

in which $R_1$, $R_2$ and $R_4$ each represent a hydrocarbon radical, and $R_3$ and $R_5$ each represent a hydrogen atom or a hydrocarbon radical, and to functional derivatives of the above compounds. The hydrocarbon radicals may also be substituted, e.g. by free, esterified or etherified hydroxyl groups, especially halogen atoms and are, more especially, lower alkyl groups, such as methyl, ethyl, propyl, isopropyl, butyl, isobutyl, tertiary-butyl or pentyl groups or phenyl.

The $\alpha:\beta$-substituted $\beta$-acyl-propionaldehydes exhibit in vitro and in vivo a valuable antibiotic action against micro-organisms such as bacteria, protozoa, moulds and viruses, for example, *Streptococcus pyogenes*, *Saccharomyces cerevisae*, *Entamoeba histolytica*, influenza virus, *Trichomonas foetus* and *Trypanosoma equiterdum*.

The aldehydes are useful as disinfecting agents or medicaments.

In the table below, for example, the antibiotic effect of $\alpha:\beta$-dimethyl-levulinic aldehyde (I) is compared with that of levulinic aldehyde (II) and 3-methyl-hexane-2:5-dione (III). The comparisons were made with filter papers of 6 mm. diameter by the paper disc method. Solutions of 1% strength in acetone-water (1:4) were used. The numbers represent the diameter of the inhibition zones.

TABLE

|  | I | II | III |
|---|---|---|---|
| Bacillus subtilis | 11–13 | 10 | none |
| Staphylococcus aureus | 11–13 | none | none |
| Escherichia coli | 10–12 | 10 | none |
| Candida tropicalis | 18–23 | none | none |
| Saccharomyces cerevisiae | 28–33 | none | none |

If a series of dilutions (to the power of ten) in glucose bouillon which have been incubated for 24 hours at 37° C. is used as test method, with a concentration of 100γ of $\alpha:\beta$-dimethyl-levulinic aldehyde (I) per cm.³, the growth, for example, of the following microorganisms is inhibited: *Micrococcus pyogenes* var. *aureus*, *Streptococcus haemolyticus*, *Corynebacterium diphtheriae*, *Escherichia coli*, *Salmonella typhosa*, *Salmonella schottmuelleri*, *Klebsiella* type A, *Pasteurella pestis*, *Vibrio chloerae* El Tor, *Bacillus megatherium*. A concentration of 10γ of a $\alpha:\beta$-dimethyl-levulinic aldehyde (I) per cm.³ inhibits the growth inter alia of the following dermatophytes and fungi (in Sabouraud medium): *Epidermophyton floccosum*, *Trichophyton interdigitale*, *Trichophyton Kaufmann Wolf*, *Microsporeum audouini*, *Achorion schoenleini*, *Aspergillus fumigatus*.

The invention also provides a process for the manufacture of the above new compounds wherein a primary $\alpha:\beta$-substituted $\beta$-acyl-aliphatic alcohol or a primary-secondary $\alpha:\beta$-substituted aliphatic $\gamma$-diol is oxidized to form the corresponding $\beta$-acyl-aliphatic-aldehyde. As oxidizing agent there may be used, for example, chromic oxide in acetic acid or pyridine or sodium bichromate in aqueous sulfuric acid. If desired, the hydroxyl groups of the aforesaid compounds may be converted into carbonyl groups by the action of air in the presence of a copper catalyst at a raised temperature.

The $\alpha:\beta$-substituted $\beta$-acyl-aliphatic alcohols or $\alpha:\beta$-substituted aliphatic $\gamma$-diols used as starting materials are known or can be made by methods in themselves known. For example, an $\alpha:\beta$-substituted $\beta$-acyl-propionic acid, especially an $\alpha:\beta$-substituted levulinic acid, especially an ester thereof, may be converted by means of a complex metal hydride, especially lithium aluminum hydride, in a suitable solvent, such as absolute ether, tetrahydrofurane or ethylene glycol diethyl ether, into the corresponding $\gamma$-diol. $\alpha:\beta$-substituted $\beta$-acyl-propyl alcohols can be obtained in this manner from acetals of $\alpha:\beta$-substituted $\beta$-acyl-propionic acids and esters thereof, especially the levulinic acid methyl ester acetal.

These reactions can be illustrated, for example, by the following formulae

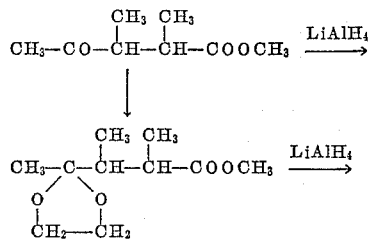

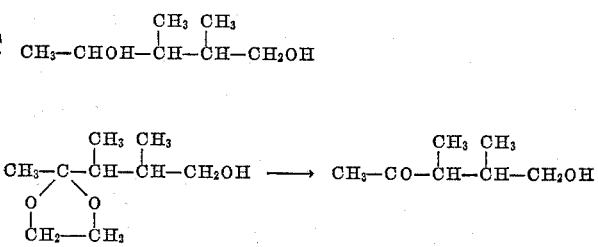

The new compounds can also be obtained by oxidizing a 1:5-diene of the general formula

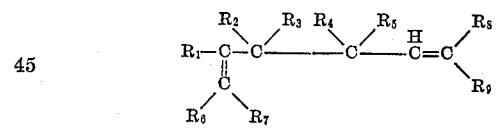

or a $\gamma:\delta$-unsaturated ketone of the general formula

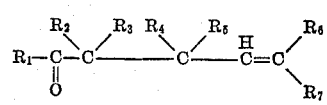

in which $R_1$–$R_5$ have the meanings given above, and $R_6$–$R_9$ each represent a hydrocarbon radical, advantageously an alkyl or aryl group, for example by treatment with ozone and splitting the ozonide.

The treatment with ozone is advantageously carried out in a solvent for example, water, aqueous acetic acid, acetic acid, chloroform, carbon tetrachloride, formamide or ethyl acetate. The ozonides so formed are converted, if desired after being isolated, by hydrolytic splitting into the carbonyl compounds. Alternatively, this splitting may be a reductive splitting such as is carried out, for example, with zinc and glacial acetic acid, or palladium and hydrogen.

The 1:5 dienes and $\gamma:\delta$-unsaturated ketones used as starting materials are known or can be made by methods in themselves known. For example, a 1:1-dialkyl- or 1:1-diaryl-Δ¹-4-carbalkoxy-5-oxo-hexane, if desired, after condensation with a reactive ester of an alcohol may be hydrolyzed and decarboxylated to form the 1:1-dialkyl- or 1:1-diaryl-Δ¹-5-oxo-hexane.

This reaction can be illustrated, for example, by the following formulae

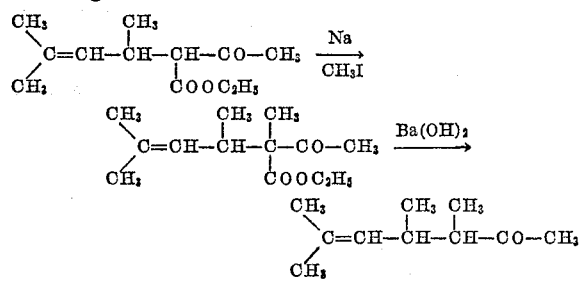

Reactive esters of alcohols are advantageously those of alkanols, especially of lower alkyl alcohols, with strong inorganic acids, for example, hydrohalic acids, or with organic sulfonic acids, for example, aliphatic lower alkyl sulfonic acids or aryl sulfonic acids. There may be used, for example, methyl iodide. The reaction is carried out in the presence of a condensing agent such as a finely divided alkali metal, an alkali salt of an alkanol, an alkali hydroxide, alkali amide or phenyl alkali salt, but more especially sodium ethylate in the presence or absence of a solvent. As solvents there may be used any anhydrous solvent, such as an alkanol, benzene, toluene, xylene, ether or an ethylene glycol dialkyl ether, but especially ether, absolute alcohol or ethylene glycol dimethy ether. For the hydrolysis there may be used any hydrolysing agent, but advantageously a base, preferably barium hydroxide.

For making 1:5-dienes there is used as starting material, for example, an adipic acid ester and the corresponding 1:5-diene is made therefrom by means of a Grignard compound, especially phenyl magnesium bromide, by the method of Barbier-Wieland/Miescher.

A further method for making the new compounds consists in splitting a pyrrole substituted in the 2-position by $R_1$ and in 3- and 4-position by $R_2$ and $R_3$ or $R_4$ and $R_5$ respectively, $R_1$ to $R_5$ having the meanings given above, by boiling it with 2 molecular proportions of a hydroxylamine to form a dioxime of a β-acyl-aliphatic aldehyde, which can then be converted by a method in itself known into the free β-acyl-aliphatic aldehyde.

The reaction may be represented, for example, as follows:

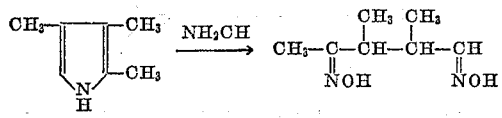

As starting materials there may be used pyrroles having hydrocarbon substituents, especially lower alkyl groups. The reaction is carried out with hydroxylamine which may be substituted at the oxygen atom, advantageously by a hydrocarbon radical, and especially a lower alkyl group. Also a salt of hydroxylamine with an inorganic or organic acid may be reacted with the calculated quantity of a base, such as ammonium or an alkali metal or alkaline earth metal hydroxide, carbonate or bicarbonate, or with an excess of a basic ion-exchange resin in a suitable solvent, such as water, an aqueous or anhydrous alcohol, and using the solution directly for the reaction.

The starting materials are known or can be made by methods in themselves known.

In an alternative process a 3-acyl-5-acyloxy-2-oxo-2:3:4:5-tetrahydrofurane of the general formula

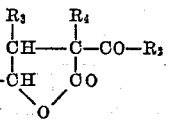

in which $R_1$ and $R_2$ each represent a hydrocarbon radical, advantageously a lower alkyl groups, $R_3$ and $R_4$ represent hydrocarbon radicals, especially lower alkyl groups, is subjected to splitting by mild alkaline hydrolysis to form a β-acyl-propionaldehyde.

For the mild hydrolysis there is used an aqueous or aqueous-alcoholic solution of a salt of a strong inorganic or organic base with a weak inorganic or organic acid, for example, sodium acetate, or an aqueous or aqueous-alcoholic suspension of an anion-exchange resin.

In particular the antibiotic acetomycin of the above formula in which $R_1$-$R_4$ represent methyl can be converted into α:β-dimethyl-levulinic aldehyde by the action of an aqueous solution of sodium acetate (W. Keller-Schierlein, M. Lj. Mihailovic and V. Prelog, Helv. Chim. Acta, 41, 220 (1958)).

As starting materials there are advantageously used those which lead to the formation of the final products stated herein to be especially useful.

The invention also includes any process in which there is used as starting material a compound obtainable as an intermediate product at any stage of the process, and the remaining steps are carried out, or the process is interrupted at any stage.

Depending on the process used there are obtained the new compounds containing free carbonyl groups or they are obtained in the form of functional derivatives thereof. From compounds containing free carbonyl groups functional derivatives may be made in the usual manner, for example, oximes or acetals. The functional derivatives can be converted by methods in themselves known into compounds containing free carbonyl groups.

The reactions are carried out by a method in itself known in the presence or absence of a diluent and/or a condensing agent and/or a catalyst, at the ordinary or a raised temperature under atmospheric or superatmospheric pressure.

The above described α:β-substituted β-acyl-aliphatic aldehydes are useful as medicaments, for example, in the form of pharmaceutical preparations, which contain the active compound in admixture with a pharmaceutical organic or inorganic carrier suitable for enteral, parenteral or local administration. For the carriers there are used substances which do not react with the new compounds, for example, gelatine, lactose, starches, magnesium stearate, talc, vegetable oils, benzyl alcohols, gums, polyalkylene glycols, white petroleum jelly, cholesterol or other known carrier for medicaments. The pharmaceutical praparations may be, for example, in the form of tablets, dragees, powders, salves, creams or suppositories, or in liquid form as solutions, suspensions or emulsions. If desired, they may be sterilized and/or may contain auxiliary substances such as preserving, stabilizing, wetting or emulsifying agents. They may also contain other therapeutically valuable substances.

The following examples illustrate the invention:

*Example 1*

8.0 grams of 2:3-dimethyl-4-keto-pentanol-(1) are mixed with a solution of 14 grams of chromic oxide in 150 cc. of pyridine, and the whole is allowed to stand at room temperature overnight. The mixture is then poured into ice water and extracted several times with chloroform. The chloroform solutions are washed with dilute cold hydrochloric acid and water, dried, and the solvent is distilled off through a Vigreux column. On vacuum distillation the residue yields 5.8 grams of a colorless oil boiling at 73-77° C. under 12 mm. pressure. The infrared spectrum of the rectified compound entirely agrees with that of α:β-dimethyl-levulinic aldehyde obtained from acetomycin.

The starting material may be prepared as follows:

31.6 grams of α:β-dimethyl-levulinic acid methyl ester and 20 grams of anhydrous ethylene glycol are heated under reflux with 1 gram of para-toluene sulfonic acid in 150 cc. of absolute benzene for 30 hours, the refluxing benzene being returned to the reaction vessel through a water separator. When about 3.5 cc. of water have been separated, the benzene solution is cooled and washed with water. The benzene is distilled off through an efficient column. The residue is distilled in vacuo. The ketal passes over as a colorless liquid at about 130° C. under a pressure of 12 mm.

30 grams of the resulting ethylene-ketal, dissolved in 100 cc. of absolute ether, are slowly added dropwise at −10° C. to a solution of 7 grams of lithium aluminum hydride in 100 cc. of ether. After 4 hours the cooling means is removed, and the mixture is allowed to stand for a further 20 hours. After decomposition with ice water and dilute sulfuric acid, the aqueous phase is agitated 4 times with ether, and the ethereal solutions are washed 3 times with a small amount of sodium chloride solution and dried. The residue which remains after driving off the ether is a mixture of a ketal and a ketone. In order to complete the hydrolysis the product is heated with 200 cc. of 2 N-sulfuric acid for 4 hours at 50° C. It is then extracted 5 times with ether, and the ethereal solutions are washed 3 times with a small amount of sodium chloride solution. The residue obtained by evaporation is distilled in vacuo, whereby 2:3-dimethyl-4-keto-pentanol-(1) passes over at 97–103° C. It is a colorless liquid which exhibits in the infra-red absorption spectrum, inter alia, strong maxima at 1715 and 3450 centimeters$^{-1}$.

*Example 2*

10 grams of 2:4:5-trimethyl-heptene-(2)-one-(6) are dissolved in 90 cc. of absolute ethyl acetate, and an oxygen current containing ozone is passed through for 140 minutes at −30 to −20° C. (27 mg. of ozone per minute; total quantity of ozone 3.78 grams=1.2 mols per mol of ketone). The cold solution is then transferred into a ground glass apparatus fitted with stirrer and gas inlet tube and 0.5 gram of palladium on barium sulfate (10% palladium) is added. The mixture is hydrogenated while cooling with ice water until absorption of hydrogen ceases (about 6 hours). The catalyst is filtered off and the solution evaporated in vacuo at 30° C. The yellowish residue is distilled through a small Vigreux column. At 70–80° C. under 11 torr 5.63 grams of α:β-dimethyl-levulinic aldehyde are obtained as a colorless oil. A second fraction of 1.57 grams boiling at 140–145° C. under 11 torr consists of α:β-dimethyl-levulinic acid. Pure dimethyl-levulinic aldehyde boils at 74–76° C. under 11 torr (a torr represents a pressure of 1 mm./sq. cm. Hg; see Taschenbuch für Chemiker und Physiker, D'Ans & Lax, Berlin, 1943, page 7).

150 mg. of the aldehyde are dissolved in 25 cc. of methanol and 420 mg. of 2:4-dinitro-phenylhydrazine are added. After boiling under reflux for half an hour, the mixture is cooled and a few drops of concentrated hydrochloric acid are added to dissolve any residue of non-reacted reagent. After allowing the whole to stand for several hours at 0° C., the yellow precipitate is filtered off and recrystallized four times from a mixture of ethyl acetate and ethanol. The resulting small yellow needles of bis-2:4-dinitrophenylhydrazone melt at 213.5–214° C.

200 mg. of dimethyl-levulinic aldehyde are reacted with semicarbazide acetate. The colorless needles of [2:3:4-trimethyl-pyrryl-(1)]-urea melt at 213–215° C.

The 2:4:5-trimethyl-heptene-(2)-one-(6) used as starting material can be prepared as follows:

5.9 grams of sodium are dissolved in 200 cc. of absolute alcohol and 54 grams of 2:4-dimethyl-5-carboethoxy-heptene-(2)-one-(6) prepared as described by Rouvé and Stoll, Helv. Chim. Acta 30, 226 (1947), are added. 100 grams of methyl iodide are added with stirring and the solution boiled under reflux for 2 hours. From the solution which now shows a neutral reaction the alcohol is distilled off to a great extent and the residue is distributed after cooling between water and ether. After washing the ether solution several times with water, it is dried with sodium sulfate and the ether distilled off. The residue is distilled in vacuo. Boiling point: 110–120° C. under 14 mm. pressure of mercury. Methylation is repeated twice under the same conditions. Finally, 43.6 grams of 2:4:5-trimethyl-5-carboethoxy-heptene-(2)-one-(6) is obtained as a pale yellow oil. Boiling point: 110–114° C. under 12 mm. pressure of mercury. Yield: 76% of the theoretical yield.

72 grams of barium hydroxide are dissolved in 600 cc. of water and solution clarified by filtration. This solution is boiled under reflux for 16 hours with 40 grams of 2:4:5-trimethyl - 5 - carboethoxy - heptene - (2)-one-(6). After cooling, the mixture is acidified with hydrochloric acid and the solution extracted three times with ether. The ether solution is washed, dried and evaporated and the residue purified by distillation in vacuo. Boiling point: 61–66° C. under 10 mm. pressure of mercury. There are obtained 18.3 grams (67% of the theory) of 2:4:5-trimethyl-heptene-(2)-one-(6) as a colorless oil. On distilling once more, the product boils at 64° C. under 13 mm. pressure of mercury.

*Example 3*

1.3 grams of 2:3:4-trimethyl-pyrrole are dissolved in 10 cc. of alcohol, 1.1 grams of sodium carbonate and 1.8 grams of hydroxylamine hydrochloride are added, and the whole is boiled under reflux for 6 hours. The mixture is then evaporated to dryness, and the residue is extracted several times at the boil with ether in order to remove unreacted starting material. The ether-insoluble residue is reprecipitated from benzene and there is obtained α:β-dimethyl-levulinic aldehyde dioxime melting at 145° C., from which the α:β-dimethyl-levulinic aldehyde described in Example 1 can be obtained by known methods.

*Example 4*

20.33 grams of acetomycin are heated with a solution of 28 grams of anhydrous sodium acetate in 135 cc. of water for 19 hours at 90–95° C. After being cooled, the reaction mixture is cautiously neutralized with solid potassium carbonate, then saturated with solid potassium carbonate, and extracted with ether. The ethereal extracts are washed with a small amount of sodium chloride solution, dried and distilled. There are obtained 8.97 grams of a colorless oil boiling at 74–76° C. under 11 mm. pressure. From the distillation residue 700 mg. of unchanged acetomycin are recovered. For the purpose of analysis the oil is again distilled in vacuo. It exhibits no optical rotation and has the constitution of α:β-dimethyl-levulinic aldehyde.

Its ultraviolet absorption spectrum exhibits only a weak absorption at 282 mμ (log ε1.31). The infra-red absorption spectrum of the liquid exhibits aldehyde bands at 2730 and 1730 cm.$^{-1}$.

The antibiotic acetomycin of the formula

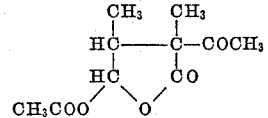

used as starting material is formed by cultivating *Streptomyces ramulosus* nov. sp. in the usual manner which was isolated from a soil specimen collected at Bandama Blanc (Ivory Coast) and is kept in our laboratories and in the Eidgenoessische Technische Hochschule, Zurich, Institut fuer spezielle Botanik, under reference No. A 17653.

*Streptomyces ramulosus* nov. sp. forms an ash-grey air mycelium. It has conidia chains which are a typical feature of the genus streptomyces. These chains form on sterile air hyphae and display short, generally almost vertical lateral branches; no spirals or whirls are formed. When the culture is grown on a peptone-containing nutrient medium no blackish brown melanoid discoloration is observed. The individual spores are smooth. The growth is relatively independent of the temperature, and the fungus develops well both at 18° C. and at 40° C., though there is an optimum between 25° C. and 32° C.

The growth of *Streptomyces ramulosus* nov. sp. on various nutrient media described below characterises it further. The nutrient media 1 to 7 and 10 were prepared according to W. Lindenbein, Arch. Mikrobiol. 17, 361 [1952].

(1) Synthetic agar: Growth at first cloudy and carmine red, subsequently wrinkly and greenish brown. Air mycelium velvety greenish grey. Substratum pale-carmine.

(2) Synthetic solution: Sediment, milk-white flocks, pellicules and ring growth deep yellow, substratum pale yellow.

(3) Glucose agar: Cloudy growth, pale yellowish red to partially greenish raven black. Air mycelium covered with floury dust, ash grey. Substratum leek green to brownish pitch black.

(4) Glucose-asparagin agar: Cloudy growth, pale yellowish red. Air mycelium greenish grey. Substratum pale carmine.

(5) Calcium malate agar: Cloudy growth, pale yellow, air mycelium woolly, chalk white to greenish grey.

(6) Gelatine stab (18° C.): Superficial pustular growth, pale yellow. Substratum pale brown. No liquefaction.

(7) Starch plate: Cloudy growth, pale yellow, substratum pale carmine. Hydrolysis after 3 weeks 3 mm.

(8) Potatoes: Growth pustular to lichen-like, yellowish red. Air mycelium chalk white to ash grey. Substratum pale carmine.

(9) Carrots: Sparse punctiform growth, pale yellow. Substratum pale carmine.

(10) Litmus milk: Pellicules wrinkly, pale yellow. Air mycelium absent. Substratum bluish violet. Sparse coagulation. Hydrolysis good.

*Streptomyces ramulosus* nov. sp., examined by the method of T. G. Pridham and D. Gottlieb, J. Bacteriology 56, 107 [1948], grows with the use of different carbon sources as follows:

| L-xylose | + | Raffinose | − |
| L-arabinose | (−) | Inulin | − |
| L-rhamnose | (+) | D-mannitol | − |
| D-fructose | + | D-sorbitol | + |
| D-glucose | + | Masoinositol | − |
| Saccharose | + | Salicin | (+) | in which
+ = good growth, definite utilisation of the carbon source used;
(+) = weak growth, utilisation of the carbon source used doubtful;
(−) = very weak growth, utilisation of the carbon source used improbable;
− = no growth, no utilisation of the carbon source used.

To prepare the antibiotic a nutrient solution is prepared from 20 grams of soya bean flour, 20 grams of mannitol and 1 liter of tap water and adjusted to pH 7.8. This solution, or a multiple thereof, is introduced into Erlenmeyer flasks of 500 cc. capacity (100 cc. nutrient solution each) or into 500-liter fermenters (30 liters of nutrient solution each) and sterilized for 20 to 30 minutes under 1 atmosphere gauge pressure. The solutions are then inoculated with up to 10% of a partially sporulating vegetative culture of *Streptomyces ramulosus* and incubated with good agitation or stirring, and in the fermenters with aeration (with about 1 volume of sterile air per volume of nutrient solution per minute) at 27° C. After having been allowed to grow for 70 to 120 hours, the cultures are filtered off with the use of a filtering assistant, according to volume either through a suction filter or a filter press or a rotary filter so as to free the antibiotically active aqueous solution from the mycelium and other solid constituents.

The filter residue from a 60-liter batch prepared as described is stirred with 10 liters of acetone and again filtered. This is repeated twice, and the acetonic solutions containing the antibiotic are combined, concentrated in vacuo to 2 liters and added to the culture filtrate. The solution is extracted with 30 liters of ethyl acetate in a Westphalia extractor, whereby the whole of the antibacterial activity passes into the organic phase. The extract is washed with water, concentrated in vacuo to 2 liters and then repeatedly shaken with 0.5 N-acetic acid and with 2 N-sodium hydroxide solution, finally drying the ethyl acetate solution over sodium sulfate and concentrating it to a volume of 50 cc. This concentrate is treated with 400 cc. of petroleum ether, whereupon the crude antibiotic acetomycin precipitates in the form of amorphous yellowish flocks. After filtration the resulting powder is dissolved in 250 cc. of hot methanol. On allowing the methanolic solution to cool, the antibiotic acetomycin separates out in fine needles. Yield:=16 grams. Melting point 115–116° C. and specific rotation $[\alpha]_D^{22} = -167°$ (c.=1.47 in ethanol).

What is claimed is:

1. α:β-Substituted β-acyl-aliphatic aldehydes of the formula

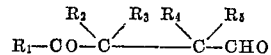

in which $R_1$, $R_2$ and $R_4$ represent lower alkyl and $R_3$ and $R_5$ each represent hydrogen.

2. α:β-Dimethyl-levulinic aldehyde.

References Cited in the file of this patent

UNITED STATES PATENTS

| 1,084,336 | Hofmann et al. | Jan. 13, 1914 |
| 2,624,764 | Emerson et al. | Jan. 6, 1953 |
| 2,651,639 | Angier | Sept. 8, 1953 |
| 2,656,360 | Hagemeyer | Oct. 20, 1953 |
| 2,725,400 | Mecorney et al. | Nov. 29, 1955 |
| 2,737,528 | Hunt | Mar. 6, 1956 |
| 2,813,903 | Freyermuth | Nov. 19, 1957 |
| 2,823,234 | Tousignant | Feb. 11, 1958 |

OTHER REFERENCES

Schierlein et al.: "Helvetica Chimica Acta," vol. 41, pp. 220–228 (1958). (Available in Sci. Library, U.S. Patent Office.)